[11] 3,609,683

[72] Inventors John P. Hoffman
Coopersburg;
Robert C. Booth, Bethlehem, both of Pa.
[21] Appl. No. 816,709
[22] Filed Apr. 16, 1969
[45] Patented Sept. 28, 1971
[73] Assignee Bethlehem Steel Corporation

[54] ELECTRONIC-SIGNAL-CORRELATING APPARATUS
10 Claims, 3 Drawing Figs.

[52] U.S. Cl. .................................................... 340/146.2,
324/77 H, 328/151, 235/181, 328/135
[51] Int. Cl. ........................................................ G06f 7/04,
H03k 5/20
[50] Field of Search ............................................. 235/177,
181; 328/151, 146, 37, 135; 324/77 H; 340/146.2

[56] References Cited
UNITED STATES PATENTS
2,977,543  3/1961  Lutz et al. .................... 328/110
3,167,738  1/1965  Westerfield .................. 340/3
3,116,458  12/1963  Margopoulos ................ 328/151 X
3,295,362  1/1967  Wood et al. .................. 235/181 X
3,303,335  2/1967  Pryor ............................ 235/181
3,334,298  8/1967  Monrad-Krohn .............. 328/135 X
3,346,844  10/1967  Scott et al. .................... 235/177 X
3,495,077  2/1970  Hiltz et al. .................... 235/181

*Primary Examiner*—Eugene G. Botz
*Attorney*—Joseph J. O'Keefe

ABSTRACT: Electronic correlator improves the apparent signal-to-noise ratio of any variable cyclic signal having recurrable true and random false signal content including noise. This arrangement enables signal-producing sources, such as scanning defect-detecting probes in nondestructive test apparatus, to be operated at unusually high levels of sensitivity. The correlator includes an analog signal detector, tapped shift register, logic and correlating mode selection circuits which operate to separate and pass true content pulses and reject all other signals. Correlation takes place whenever coincidence occurs between a recurring instantaneous true content pulse and a stored true content pulse from either the same or a leading or lagging increment of a single, multiple or related fractional cycle of the cyclic signal history.

PATENTED SEP28 1971 3,609,683
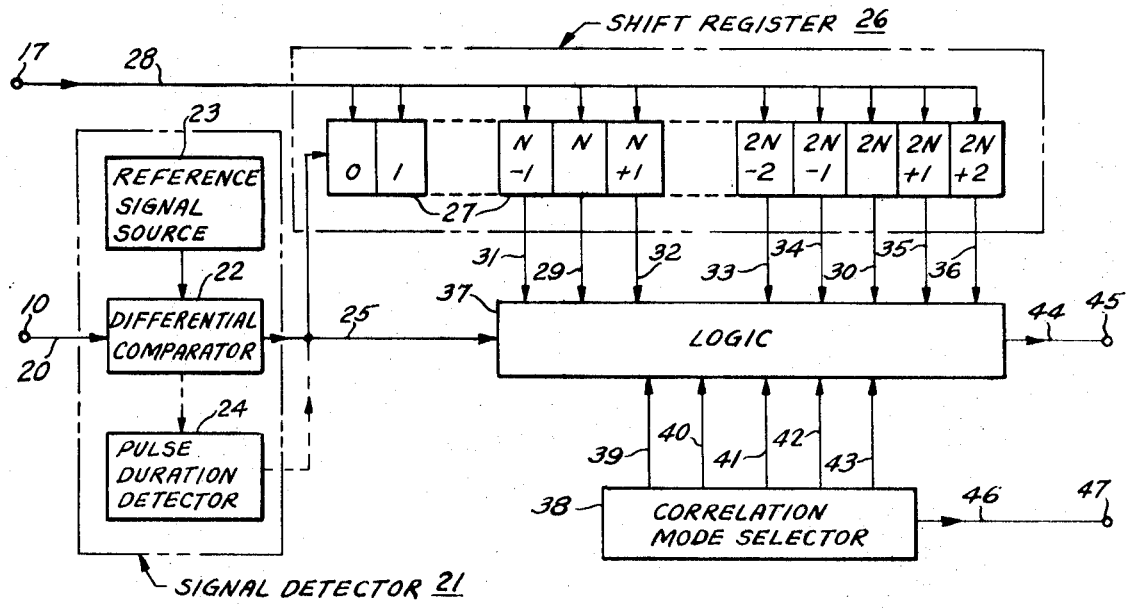
FIG. 1
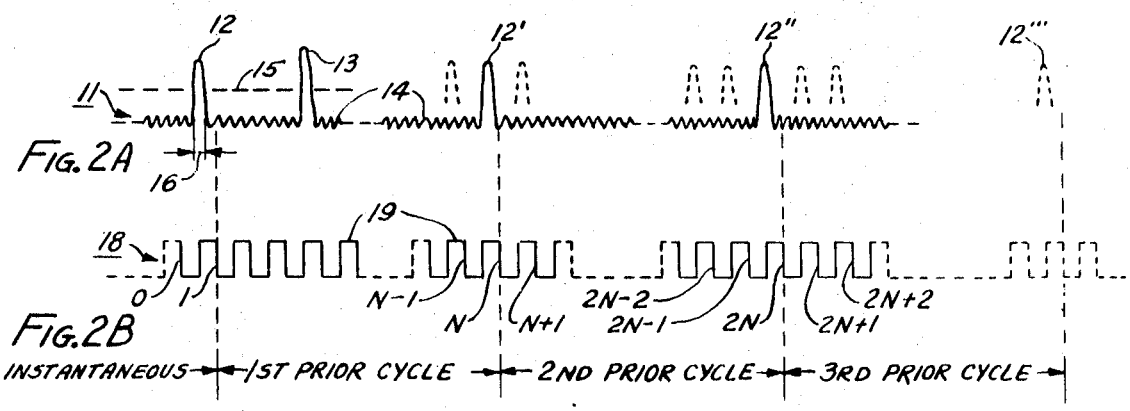
FIG. 2A
FIG. 2B
INSTANTANEOUS — 1ST PRIOR CYCLE — 2ND PRIOR CYCLE — 3RD PRIOR CYCLE
INVENTORS
John P. Hoffman
Robert C. Booth

ELECTRONIC-SIGNAL-CORRELATING APPARATUS

BACKGROUND OF THE INVENTION

This invention relates to electronic correlators. More particularly, it relates to electronic correlators for improving the apparent signal-to-noise ratio of cyclic signals having recurrable true and random flash signal content, including a background of noise.

The invention has application in, but is not limited to, nondestructive test apparatus where ordinarily a noise-degraded analog cyclic defect signal is generated, for example, by a defect-detecting probe which either scans or otherwise has relative movement with a test piece at various speeds, and where scanning incremental position pulses are also produced for orienting probe position relative the test piece as well as instantaneous values of the cyclic defect signal. In such apparatus, the cyclic defect signal varies in rate and waveform characteristics and is composed of a recognizable pattern of recurrable true and random false signal content including noise. That is, a defect signal is considered true when it reoccurs in approximately the same incremental surface position of the test piece for at least one successive scanning cycle and considered false when occurring randomly and intermixed with the true signal content. The invention is applicable to other types of electronic apparatus having first and second signal sources comparable to the defect signal and scanning incremental position pulse sources mentioned above and where it is desirable to improve the signal-to-noise ratio of the first signal.

It has been discovered that by correlating a noise-degraded cyclic defect signal produced, for example, by nondestructive test apparatus that the signal-to-noise ratio of the defect signal may be substantially improved. By correlating the defect signal is meant to determine that true defect signals reoccur in approximately the same incremental surface position of the test piece for one or more successive scanning cycles and separating the recurring true defect signals from random false defect signals and noise, and rejecting the latter two signal components. This technique has the advantage of allowing detector probes to be operated at considerably higher levels of sensitivity than heretofore so that shallow defects frequently masked by noise may now be detected with improved precision and accuracy. Further, it permits range expansion of prior art test apparatus to cover test pieces having greater dimensional properties than were heretofore attainable. Similar advantages will be found in other types of electronic apparatus.

Most prior art correlators of cyclic analog signals are either the conventional auto- or cross-correlating devices typified by T. B. Van Horne in U.S. Pat. No. 2,840,308 entitled "Electronic Correlator." Here, for example, a cyclic analog voltage representative of a function to be correlated is time-sampled repetitively and fed both instantaneously and by way of an incremental delay to respective temporary storage units which are reset after each sample. Before resetting, both stored signals are fed to a computer element for performing time-dependent mathematical operations involved in well-known conventional signal correlation. Computer output is an amplitude-variable signal representing the correlated function and is based on the time average product of the instantaneous and delayed voltages.

Conventional auto- and cross-correlators are not useful in carrying out the above-noted type of defect signal correlation for a number of reasons. One reason is that no output voltage, including the time average product of the instantaneous and delayed voltages, which is representative of a conventional correlation function is utilizable to signify the occurrence of the defect signal type of correlation. Another reason is that the time-sampled voltages and time-dependent mathematic operations performed on these voltages are neither necessary nor desirable to carry out the position-dependent type of defect signal correlation noted above. Still another reason is that none of the conventional correlators is capable of accommodating multiple correlating modes for the signal to be correlated.

SUMMARY OF THE INVENTION

One of the objects of this invention is to provide correlating apparatus for improving the apparent signal-to-noise ratio of a variable cyclic signal having recurrable true and random false signal content including noise.

A further object of this invention is to provide said correlating apparatus with signal detection capability having improved precision, accuracy and reliability.

Another object of this invention is to provide said correlating apparatus with the capability of accommodating multiple correlating modes for the signal to be correlated.

Other and further objects of this invention will become apparent during the course of the following description and by reference to the accompanying drawing and appended claims.

The foregoing objects can be obtained with electronic correlating apparatus wherein an analog signal detector rejects the nose and produces true and false content digital pulses when the true and false signals differ from a predetermined waveform characteristic. These digital pulses are stored in and transferred incrementally through a multistage shift register in response to cyclic sequences of incremental position pulses per cycle of signal to be correlated acting on the register shift circuit. The shift register has various output taps at stages corresponding to single, multiple and related fractional cycles of the cyclic signal history. Logic means operating under control of a correlating mode selector enables the comparison of the detector output with one or more shift register outputs. This results in passing a true content digital pulse to the correlator output when coincidence occurs between an instantaneous true content pulse and a stored true content pulse and, in addition, in rejecting the false content pulses. Correlation may take place during either the same or a leading or lagging increment of a single, multiple or related fractional cycle of the cyclic signal history.

DESCRIPTION OF THE DRAWING

FIG. 1 is a block diagram of an electronic correlator of the present invention.

FIG. 2A is a graphic illustration of a variable cyclic signal to be correlated.

FIG. 2B is a graphic illustration of a variable cyclic sequence of incremental pulses related to the cyclic signal shown graphically in FIG. 2A.

DESCRIPTION OF THE PREFERRED EMBODIMENT

Referring to the drawing, the electronic correlator of the present invention is provided with first input means 10 and is adapted to receive at means 10 first signal 11, the signal to be correlated. This signal is the cyclic analog signal shown in FIG. 2A which, for example, represents the output produced by a scanning probe in nondestructive test apparatus (not shown). First signal 11 is composed of recurrable true signals 12, random false signal 13 intermixed with true signals 12, and a background of noise 14.

Depending on the characteristics of its source, first signal 11 may have variable rates of recurrency as well as variable waveform characteristics. As an example of the latter, the amplitude of true and false signals 12, 13 may rise above a reference level 15, which has been preestablished above a base level, or signal width 16 may differ from a predetermined value thereof. Recurrable true signals 12, 12', 12'' represent true defects which occurred instantaneously and during the first and second prior scanning cycles, respectively. For purposes of illustration, a true defect was not present in the third prior cycle, but if it had been, it would have appeared as 12'''. Random false signals 13, regardless of their source, are considered not to reoccur in the same increment of a successive scanning cycle and for this reason only one such pulse is shown in FIG. 2A.

In practice, the scanning speed of a defect-detecting probe for example, may differ from test piece to test piece, or may even vary during inspection of the same test piece, thus causing a variation in periodicity between true signals 12, 12', 12'', etc. In addition, a sequence of true defects in successive scanning cycles having an axis that is skewed with respect to an axis resulting from relative movement between a probe and a test piece, may reoccur in either leading or lagging cyclic increments as shown by the dotted-line waveforms adjacent both sides of true signals 12', 12''. This also causes a variation in true signal periodicity, but would not change scanning cycle periodicity. The correlator of this invention is based on position-dependent operation to accommodate the foregoing variations in periodicity, as will become apparent hereinafter, rather than being based on conventional time-dependent correlation functions for operation as in prior art devices.

The correlator is also provided with second input means 17 and is adapted to receive second signal 18 at means 17. Second signal 18, as shown in FIG. 2B, consists of a variable cyclic sequence of N incremental pulses 19 per sequence. The periodicity of a sequence of pulses 19 must be synchronized with that of the scanning cycle of the source that produces first signal 11 so that any variation in the periodicity of first signal 11 will automatically be followed by the same variation in second signal 18. The number of pulses 19 per sequence must equal a predetermined fixed number of incremental positions in each scanning cycle of the aforementioned source. Under the foregoing conditions, a predetermined fixed relationship exists between the position of each incremental position pulse 19 and the position of a comparable incremental surface area of the aforementioned test piece, thereby avoiding time dependence as a basis for correlator operation.

Turning now to FIG. 1, input means 10 is supplied with variable cyclic first signal 11 which is fed over circuit 20 to signal detector 21. Depending upon pattern recognition requirements of first signal 11, signal detector 21 in a simple form may consist of conventional differential comparator 22 receiving first signal 11 over circuit 20 at one of its inputs, and variable reference signal source 23 having its output fed to another of comparator 21 inputs. If it has been predetermined that true and false signals 12, 13, should be processed only when their waveform characteristics exceed a predetermined amplitude, then the output of source 23 is adjusted to say signal reference level 15. As a result comparator 21 will reject noise content 15 and cause true and false content digital pulses having about the same width as signals 12, 13 to be produced substantially instantaneously at the output of signal detector 21, whenever true and false signals 12, 13 exceed the output of source 23.

Where pattern recognition requirements of first signal 11 are more severe, and it has been predetermined that true and false signals 12, 13 should be processed only when their waveform characteristics exceed predetermined values of both amplitude and width, then signal detector 21 may be modified to include variable pulse width detector 24. Accordingly, comparator 22 output may be diverted from detector 21 output to the input of pulse width detector 26 and the output of detector 26 may serve as signal detector 21 output, both as shown by dotted lines in FIG. 1. With this arrangement, comparator 22 produces true and false intermediate digital pulses when the amplitude of respective true and false signals 12, 13 exceed the output of source 23. These pulses activate pulse width detector 24 and cause it to produce the true and false content digital pulses at the output of detector 21 substantially instantaneously whenever the width of true and false signals 12, 13 differs from a predetermined value of say pulse width 16.

The true and false content digital pulses are fed over detector output circuit 25 to means responsive to second signal 18 for storing and transferring the true and false content digital pulses in and through a predetermined number of incremental storage positions, said storage positions being situated between a storage input circuit and a predetermined number of output circuits which correspond to the cyclic increments at single, multiple and related fractional cycles of first signal 11 history. Such means for effecting pulse storage and transfer may consist of magnetic tape, disc or drum devices or static magnetic cores and the like. However, shift register 26, which is of conventional design, is preferred over the other devices and is constructed, for example, of a predetermined number of serially connected conventional binary storage elements 27, or stages, each consisting of an integrated circuit type of solid-state device having a shift circuit connected to second input means 17 be way of circuit 28. Thus, second signal 18 having the variable cyclic sequence of incremental position pulses 19 acts as a variable source of shifting pulses.

Shift register 26 comprises stage O and M sections of at least N stages per section, plus additional incremental stages as noted below. Stage O, or a setting stage, is located at shift register 26 input circuit and receives the instantaneous true and false content digital pulses over circuit 25. These pulses generally occur somewhere within a cyclic increment and stage O stores them temporarily, that is for the remainder of said increment, before transferring them to subsequent stages in response to the shifting pulses of second signal 18.

The number of M sections of shift register 26 correspond to a predetermined number of prior cycles, or history, of first signal 11 that are to be stored. N corresponds to a predetermined number of incremental storage stages per section, or cycle, and is equal to the N incremental position pulses 19 in a sequence of pulses in second signal 18. The actual numerical value of both M and N is governed by the degree of reliability and precision of signal correlation that is to be achieved, there being practical limitation for both values. For example, the larger M is made, the greater the number of pulses that become involved in determining whether the pulse is true or false, thus increasing the reliability of such determination. Further, the larger N is made, the greater number of increments there are in every cycle of first signal 11. This increases the precision with which a true signal 12 can be located in a given cycle, and correspondingly the position of a defect in a test piece when first signal 11 is representative of a defect signal.

Shift register 26 includes a number of output circuits which provide for several degrees of reliability of operation as well as for accommodating leading and lagging true and false signals 12, 13 in successive cycles of first signal 11. These output circuits are derived by tapping the output of one or more preselected stages 27. In its simplest form, shift register 26 consists of one section of N stages per section and stage N output is fed to circuit 29. For greater reliability, two sections of N stages per section are provided with stages N and 2N outputs fed to respective circuits 29, 30 and so on. To accommodate leading and lagging true and false signals 12, 13 in a one-section shift register 26, an additional stage 27 must be added and stages N, N−1 and N+1 outputs fed to respective circuits 29, 31 and 32. In a two-section shifter register 26, two additional stages 27 should be added and stages N, N−1, N+1, 2N, 2N−2, 2N−1, 2N+1 and 2N+2 outputs fed to respective circuits 29, 31, 32, 30, 33, 34, 35, and 36. It will be apparent that a correlator with the greater versatility would be the latter embodiment. For this reason and purposes of illustration the shift register 26 shown in FIG. 1 includes 2N+2 stages.

After true and false content digital pulse enter stage O, they are transferred incrementally through successive stages in response to the shifting pulses of second signal 18 which are applied simultaneously to the shift circuit of each stage 27. Pulse transfer continues until each pulse is passed out of the last stage in shift register 26. Shifting occurs at the position of the negative-going, or trailing, edge of pulse 19 as indicated at 0, 1, N, etc. in FIG. 2B.

Circuit means operating under one of a number of correlating modes is provided for enabling the comparison of detector 21 output with one or more shift register outputs 29–36. This circuit means passes true content digital pulses when coincidence occurs between an instantaneous and a stored true content digital pulse under one of the number of correlating modes as will be explained below. Random false content signals are rejected for the lack of coincidence with another false content pulse.

The above-mentioned circuit means includes control logic means 37 operating under control of correlating mode selector means 38. Control logic means 37 consists of a plurality of conventional solid-state NAND gates which are simply connected in a coincidence circuit arrangement and adapted to receive (a) the instantaneous true and false content digital pulses over circuit 25, and (b) one or a predetermined combination of the true and false content digital pulses over circuits 29–36. The NAND gates, which operate under control of correlation mode selection signals received from selector means 38, are circuited to inhibit the passage of all coincident digital pulses until enabled by the selection signals.

Although there are many possible correlating modes that can be derived, only five have been chosen for illustrative purposes. These are identified with one or more shift register 26 outputs and consists of: N stage, 2N stage, N and N± stages, 2N and 2N±1 stages and 2N, 2N±1 stages and 2N, 2N±1 and 2N±2 stages, respectively. Selector means 38, which consists simply of a conventional five-position multipole selector switch, is adapted to provide corresponding correlation mode selection signals over circuits 39–43 to the NAND gates in control logic means 37. Thus, the NAND gates in means 37 are caused to selectively enable a coincidence comparison between detector 21 instantaneous output pulse and any predetermined one or a group of pulses temporarily stored in shift register 26. Whenever pulse coincidence does occur between a recurring instantaneous true pulse and a stored true content digital pulse from either the same or a leading or lagging increment of a single, multiple or related fractional cycle of the first signal 11 history, then control logic means 37 passes only a true content digital pulse over circuit 44 to first correlator output means 45. This pulse may be relied upon by an external indicator, recorder or other utilization device to represent only true content of the first signal 11 and that any noise or false pulse content has been rejected. The degree of reliability is determined by which of the aforesaid correlating modes was preselected.

As an optional feature, the selector switch of correlation mode selector means 38 may include additional indicating circuit poles to provide signals over circuit 46 to second correlator output means 47 for identifying the correlating mode of the true content digital pulse appearing at first correlator output means 45.

In an alternative embodiment, the electronic correlator of this invention may be used to correlate digital input signals instead of analog input signals as described above. In such an embodiment, first signal 11 will contain the true and false content digital pulses normally produced at the output of signal detector 21, rather than contain the true and false analog signals 12, 13 shown in FIG. 2A. Hence, circuit 20 and signal detector 21 are deleted from the embodiment of FIG. 1 and input means 10 is connected directly by way of circuit 25 to the inputs of shift register 26 and control log 37. Operation of the alternative embodiment is the same as above beginning at shift register 26, whereby only recurrent true content digital pulses are passed to correlator output means 45 and the random false content digital pulses are rejected.

We claim:

1. In electronic apparatus having a first variable cyclic signal produced with recurrable true signal content pulses intermixed with random false signal content pulses, and having a second variable cyclic signal synchronized with the first signal which is produced with a recurring sequence of N incremental position pulses per cycle of the first signal, an electronic correlator comprising:
   a. first input circuit means for receiving a signal to be correlated consisting of the first variable cyclic signal,
   b. second input circuit means for receiving the second variable cyclic signal,
   c. means receiving the first signal and operative in response to the second signal pulses for storing and transferring the true and false content pulses in and through a predetermined number of incremental storage positions, said storage positions situated between a storage input circuit and a predetermined number of storage output circuits which correspond to cyclic increments at single multiple, or related fractional cycles of first signal history, and
   d. circuit means including a correlator output means operating under one of a number of correlating modes for enabling the comparison of the signal at means (a) with at least one of the means (c) outputs, said circuit means passing a true content pulse to the correlator output means when coincidence occurs between an instantaneous true content pulse and a stored true content pulse, said circuit means rejecting random false content pulses.

2. Apparatus for electronically correlating a cyclic analog signal to improve its apparent signal-to-noise ratio, said signal having a variable rate of recurrency and composed of true signals recurrable in one or more cycles, random false signals intermixed with the true signals, and a background of noise, both true and false signal content having at least one variable waveform characteristic, said apparatus comprising:
   a. FIrst input means for receiving a first signal consisting of the cyclic analog signal to be correlated,
   b. second input means for receiving a second signal synchronized with the first signal and consisting of a recurring sequence of N incremental position pulses per cycle of the first signal,
   c. first-signal-detecting means for rejecting the noise and converting the true and false signals into true and false content digital pulses whenever the respective signals differ from at least one predetermined waveform characteristic,
   d. means receiving means (c) output and operative in response to the second signal pulses for storing and transferring the true and false content digital pulses in and through a predetermined number of incremental storage positions, said storage positions situated between a storage input circuit and a predetermined number of storage output circuits which correspond to cyclic increments at single, multiple, or related fractional cycles of first signal history, and
   e. circuit means, including a correlator output means, operating under one of a number of correlating modes for enabling the comparison of the means (c) output with at least one of the means (d) outputs, said circuit means passing a true content digital pulse to the correlator output means when coincidence occurs between an instantaneous true content pulse and a stored true content pulse, said circuit means rejecting random false content digital pulses.

3. The electronic apparatus of claim 2 wherein first signal-detecting means (c) comprises:
   f. a reference signal source, and
   g. differential comparator means receiving said first signal and the reference signal for causing the production of said true and false content digital pulses at a detector means output circuit.

4. The electronic apparatus of claim 3 wherein reference signal source (f) is amplitude variable and differential comparator means (g) causes the production of said content digital pulses when the first signal amplitude exceeds that of reference signal source (f).

5. The electronic apparatus of claim 2 wherein first signal-detecting means (c) comprises:
   h. a variable-amplitude reference signal source,
   i. differential comparator means receiving the first signal and the reference signal for producing true and false intermediate digital pulses at its output when the first signal amplitude exceeds that of the reference signal source, and
   j. intermediate pulse width detector means for causing the production of said true and false content digital pulses at a detector means (c) output circuit whenever the width of an intermediate digital pulse exceeds a predetermined value.

6. The electronic apparatus of claim 2 wherein means (d) includes:

k. shift register means for storing and transferring the true and false content digital pulses stepwise between said input and output circuits, said shift register means having M sections of at least N stages of serially connected binary storage elements per section, each of the binary elements having a shift circuit connected to the incremental position pulse source at means (b).

7. The electronic apparatus of claim 6 wherein shift register means (k) includes:
   l. at least 2N stages with outputs tapped at N and 2N stages connected to circuit means (e).

8. The electronic apparatus of claim 6 wherein shift register means (k) includes:
   m. at least 2N stages with outputs tapped at N, 2N and other predetermined stages adjacent N, 2N or N and 2N stages connected to circuit means (e).

9. The electronic apparatus of claim 2 wherein circuit means (e) includes:
   n. correlating mode selecting means for providing separate selection signals so that signal correlation may take place during either the same, or one or more leading or lagging, recurring increments of the cyclic first signal, and
   o. logic means operating under control of the correlating mode selection signals for enabling the comparison of means (c) output with means (d) outputs and the passage of the true content digital pulse.

10. The electronic apparatus of claim 9 including:
   p. a second correlator output circuit fed by means (n) for identifying the correlating mode of the true digital content pulse.